(12) United States Patent
Gebert

(10) Patent No.: US 8,026,687 B2
(45) Date of Patent: Sep. 27, 2011

(54) OPERATING METHOD FOR A MACHINE WHICH IS DRIVEN USING A DRIVE, WITH STATE IDENTIFICATION BY MEANS OF FREQUENCY ANALYSIS

(75) Inventor: Karl Gebert, Schweinfurt (DE)

(73) Assignee: Siemens Aktiengesellschaft, München (DE)

( * ) Notice: Subject to any disclaimer, the term of this patent is extended or adjusted under 35 U.S.C. 154(b) by 279 days.

(21) Appl. No.: 12/399,403

(22) Filed: Mar. 6, 2009

(65) Prior Publication Data
US 2010/0070094 A1 Mar. 18, 2010

(30) Foreign Application Priority Data

Mar. 7, 2008 (EP) .................................... 08004287

(51) Int. Cl.
*G05B 11/36* (2006.01)
(52) U.S. Cl. .......................... 318/609; 318/607; 318/611
(58) Field of Classification Search .................. 318/609, 318/607, 611, 606, 400.23, 400.24; 700/280; 73/290
See application file for complete search history.

(56) References Cited

U.S. PATENT DOCUMENTS
5,927,275 A * 7/1999 Loser et al. .............. 128/205.24

FOREIGN PATENT DOCUMENTS
| DE | 195 45 008 A1 | 8/1997 |
|---|---|---|
| DE | 101 44 076 A1 | 3/2003 |
| DE | 10 2007 034 344 A1 | 1/2008 |

* cited by examiner

*Primary Examiner* — Karen Masih
(74) *Attorney, Agent, or Firm* — Henry M. Feiereisen; Ursula B. Day

(57) ABSTRACT

A machine having a drive that directly or indirectly excites vibrations in the machine over a frequency range when the drive is connected to the power supply. A sensor detects a time-dependent signal that is characteristic of the excited vibrations. The time-dependent signal is transmitted to a control device that analyzes the frequency of the time-dependent signal and relates the frequency analysis to the excitation that produces the excitation and uses this relationship to determine a state of at least one element of the machine. The control device outputs a message to an operator of the machine on the basis of the state that is determined. Preferably, the control device applies an interference variable that has at least one frequency inside the frequency range to the drive so as to excite vibrations. The interference variable may be a sinusoidal interference variable whose frequency passes through the frequency range, or a pseudobinary interference variable whose spectrum covers the frequency range. If the drive is an electrical three-phase drive, asymmetrical energization may be used.

27 Claims, 3 Drawing Sheets

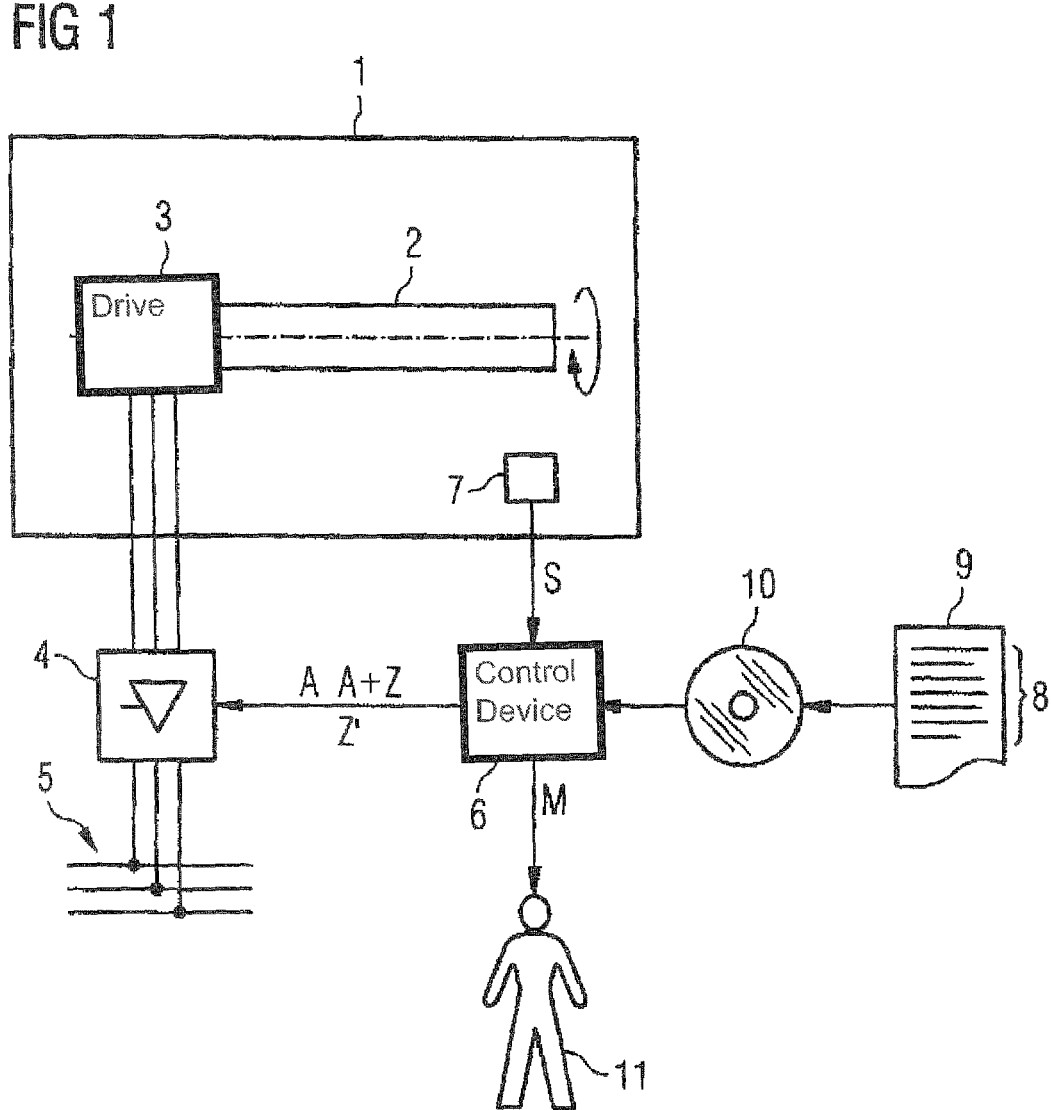

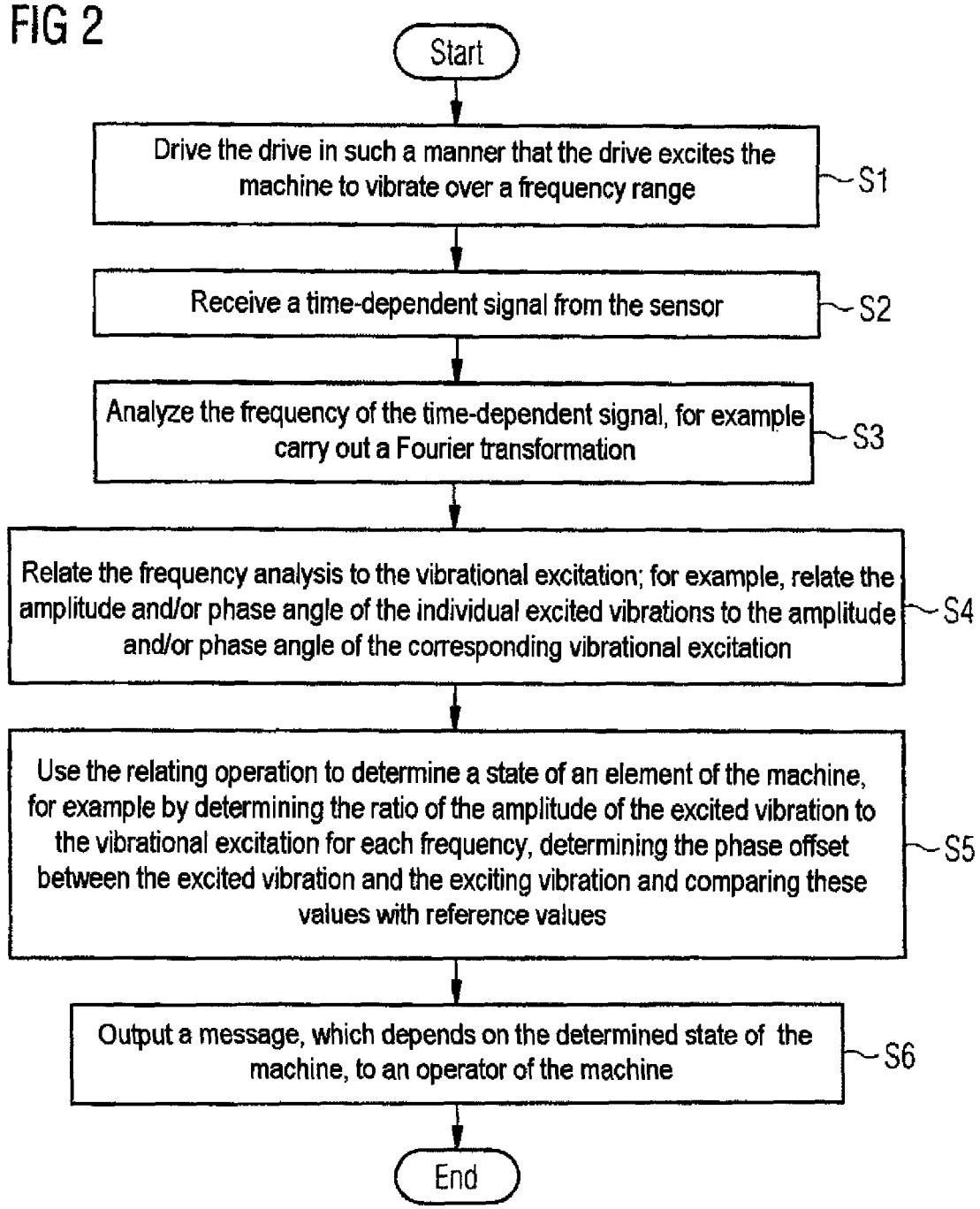

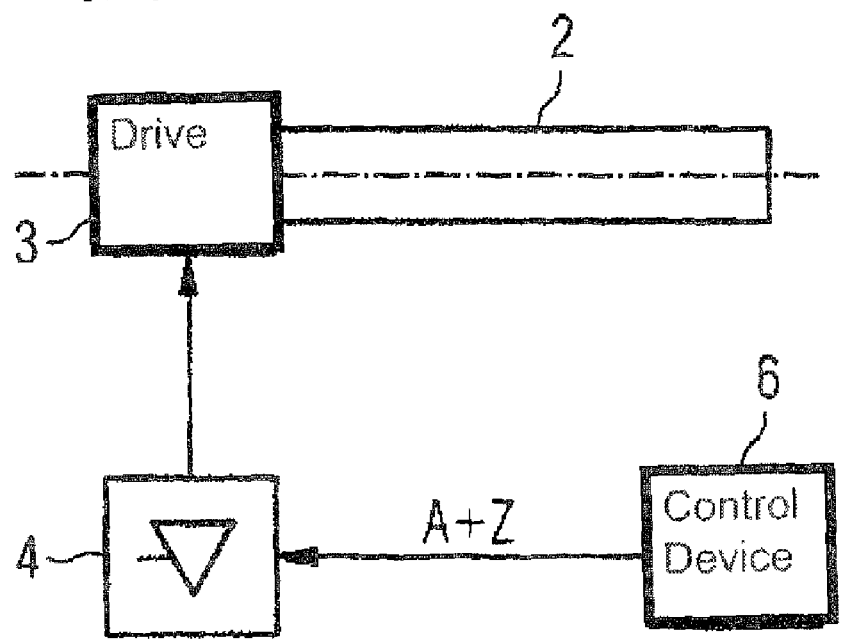

OPERATING METHOD FOR A MACHINE WHICH IS DRIVEN USING A DRIVE, WITH STATE IDENTIFICATION BY MEANS OF FREQUENCY ANALYSIS

CROSS-REFERENCES TO RELATED APPLICATIONS

This application claims the priority of European Patent Application, Serial No. EP 08004287, filed Mar. 7, 2008, pursuant to 35 U.S.C. 119(a)-(d), the content of which is incorporated herein by reference in its entirety as if fully set forth herein.

BACKGROUND OF THE INVENTION

The present invention relates to a method and apparatus for operating a machine that detects a state of an element of the machine for controlling operation of the machine.

The following discussion of related art is provided to assist the reader in understanding the advantages of the invention, and is not to be construed as an admission that this related art is prior art to this invention.

Machines in which a controller connects a drive to a power supply via at least one actuator and receives a time-dependent signal from a sensor in the machine are generally known. Typical examples of such machines are drilling machines, lathes, circular saws and band saws as well as other machines. In many cases, the drive is a rotating drive. In some cases, however, the drive may be in the form of a linear drive.

Machines generally have many individual components. Some of the components are rigid, while others are movable but are usually not moved and yet others are moved in the normal state. Examples of rigid components are the basic body of the machine and the lining of the machine. One example of a component which is rarely moved is a covering shroud which is used to cover a machining area of the machine. Movable parts are, for example, shafts, bearings and spindles. The individual components of the machine are subject to wear and other changes over time. Some of these changes are harmless, some are critical, and some require immediate intervention in the operating sequence in order to avoid consequential damage.

It is known practice to provide sensors in order to monitor critical components. For example, temperature sensors are arranged in the vicinity of rolling bearings in order to be able to detect rolling bearing damage as early as possible. The use of acceleration sensors, distance sensors or pressure sensors is also known. The sensor signals determined by the sensor used, in particular the temporal change in said signals, and predefined limit values make it possible, in many cases, to draw conclusions on the state of rolling bearings or other components of the machine.

The procedure in the prior art has various disadvantages. For example, the sensors used and, in particular, the evaluation circuits used are often expensive. Furthermore, it is often difficult to integrate the sensors and the evaluation circuits in the machine or in the electrical drive. Furthermore, the sensors are often susceptible to interference. It is often also difficult to transmit signals. Furthermore, in many cases, a single signal does not suffice to clearly and reliably describe the system state. Furthermore, the practice of coupling external sensor signals or signals from evaluation circuits into a numerical controller or into a converter is associated with a considerable amount of effort in many cases and is also undesirable for technical reasons attributable to the system. Furthermore, interference and other process influences during operation often prevent the detected signals from being clearly evaluated. Finally, meaningful and convincing limit values for determining wear states cannot always be determined reliably since the individual components of the machine interact with one another.

It would therefore be desirable and advantageous to address prior art problems and to obviate other prior art shortcomings and to determine the state of rolling bearings and other components of the machine in a cost-effective, simple and clear manner.

SUMMARY OF THE INVENTION

According to one aspect of the present invention, a drive is connected to a power supply by a control device of the machine using at least one actuator. When connected to the power supply, the drive directly or indirectly excites vibrations in the machine having a frequency range. A sensor is used to detect a time-dependent signal which is characteristic of the excited vibrations. The time-dependent signal is transmitted to the control device. The control device analyzes the frequency of the time-dependent signal. The control device relates the frequency analysis to the excitation that produced the vibrations and uses this relationship to determine a state of at least one element of the machine. The control device outputs a message to an operator of the machine on the basis of the state that is determined.

According to another advantageous feature of the present invention, the control device may apply an interference variable that has at least one frequency inside the frequency range to the drive so as to excite vibrations.

According to another advantageous feature of the present invention, the interference variable may be a sinusoidal interference variable whose frequency passes through the frequency range. This refinement of the operating method results in particularly reliable evaluations.

As an alternative, it may be possible for the interference variable to be a pseudobinary interference variable whose spectrum covers the frequency range. This procedure has the advantage that it can also be used during normal operation of the machine.

If, for example, the drive is an electrical three-phase drive, it is possible to carry out asymmetrical energization or to excite the normal drive signal of the drive in a suitable manner. In this case, the machine produces characteristic vibrations depending on the excitation that is applied. These vibrations can be detected by a corresponding sensor and can be evaluated by the control device.

As it is used here, the term "vibration" should be understood as meaning an oscillating mechanical movement in at least one element of the machine that is not a useful movement of the machine. If, for example, the drive drives a shaft and, via the shaft, a piston, the rotation of the shaft and the displacement of the piston are the useful movements of the machine and all other oscillating mechanical movements are vibrations. The vibration may occur at a single frequency or at multiple frequencies.

The transfer function of the machine can thus be determined and evaluated as a result. The transfer function describes the response of the machine to excitation, i.e. the ratio between an output variable or system response (the excited vibrations) and an input variable or system excitation (drive applied to the electrical machine). The transfer function can completely map a system. Conclusions concerning the state of individual components of the system can consequently be drawn from the transfer function of the response of a system. Furthermore, simultaneously, transfer functions always make it possible to reliably assess the overall response of the system.

The procedure according to the invention thus makes it possible to monitor and troubleshoot the machine. The excitation signal can be generated directly by the drive, advantageously. There is no need for any external excitation.

The drive may be optionally an electrical, hydraulic or pneumatic drive. However, it is usually an electrical drive.

According to another advantageous feature of the present invention, the actuator may be switched by the control device only in binary manner. Alternatively, the actuator may be driven by the control device in a proportional manner.

According to another advantageous feature of the present invention, the sensor may be of any desired configuration if it is only suitable for detecting the corresponding signal. For example, the sensor may be in the form of a displacement sensor, a velocity sensor, an acceleration sensor, a force sensor or a pressure sensor.

In individual cases, it may be sufficient if the signal detected by the sensor is characteristic only of the amplitude of the excited vibrations or only of the phase angle of the excited vibrations. However, the signal detected by the sensor will generally be characteristic of the amplitude and the phase angle of the excited vibrations.

The control device generally relates the amplitude and/or phase angle of the excited vibrations to the amplitude and/or phase angle of the vibrational excitation. This is then used to determine the state of the at least one element of the machine.

According to another aspect of the present invention, a computer program in includes machine code that can be directly executed by the control device and causes the machine to operate in accordance with the operating method of the invention.

In addition, the execution of the machine code preferably causes the control device to also implement one of the advantageous refinements of the operating method.

According to yet another aspect of the present invention, a data storage medium on which such a computer program is stored in machine-readable form.

According to still another aspect of the present invention, a computer program includes a control device for the machine. The machine is driven by a drive and the control device is programmed using a computer program of the type described above so that the control device can operate in accordance with the method of the present invention.

According to another advantageous feature of the present invention, the control device of the machine may be designed in such a manner that it is also able to carry out one of the advantageous refinements of the operating method.

According to still another aspect of the present invention, a machine is constructed so as to implement the method of the present invention. The machine has a drive that drives the machine, a control device and a sensor. The control device drive can connect the drive to a power supply via at least one actuator so that the electrical drive directly or indirectly excites the machine to vibrate over a frequency range and the drive starts up from a standstill when connected to the power supply. The sensor detects a time-dependent signal that is characteristic of excited vibrations and transmits it to the control device. The control device then analyzes the frequency of the time-dependent signal, and relates the frequency analysis to the vibrational excitation to determine a state of at least one element of the machine. The control device then outputs a message to an operator of the machine for the state that was determined.

According to another advantageous feature of the present invention, the control device may apply an interference variable that has at least one frequency inside the frequency range to the drive so as to excite vibrations.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic illustration of a machine in accordance with the invention, FIG. 2 shows a flowchart of the method of the invention, and FIG. 3 shows types of excitation that can be used for producing vibration in accordance with the invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic illustration of a machine in accordance with the invention, including a basic body 1 and a shaft 2 that is rotatably mounted in the basic body 1, for example a spindle shaft of a lathe. The spindle shaft 2 (or more generally the machine) can be driven using an electrical drive 3. The electrical drive 3 is generally a three-phase AC motor which is supplied from a power supply system 5 via a converter 4.

The configuration of the machine explained above is purely exemplary. For example, the machine need not be in the form of a lathe but rather could be another machine. In addition, the drive 3 need not be a three-phase drive but may be another electrical drive. Strictly speaking, the drive 3 need not even be in the form of an electrical drive. It could also be in the form of a hydraulic or pneumatic drive. The decisive factor is that the drive 3 is able to start up from a standstill when it is connected to the power supply system 5 (or more generally a power supply) via the converter 4 (or another suitable actuator or a corresponding group of actuators). In addition, it is not absolutely necessary to supply the electrical drive 3 via a converter 4.

In the case of a hydraulic or pneumatic drive, the converter 4 is, of course, replaced with other suitable actuators, in particular valves. Irrespective of the type of drive 3 (electrical, hydraulic, pneumatic), it is possible for the control device 6 to switch the corresponding actuator 4 (for example the individual semiconductor switches of the converter 4) in purely binary manner. However, depending on the configuration of the actuators, in particular in the case of hydraulic and pneumatic drives 3, it is alternatively possible to drive the actuators in a proportional manner.

The machine also has a control device 6. The control device 6 controls the machine. In particular, the control device 6 drives the electrical drive 3 directly or indirectly via the converter 4 depending on the configuration of the machine. Furthermore, it receives, from at least one sensor 7 of the machine, a time-dependent signal S which is detected by the sensor 7.

The control device 6 is in the form of a software-programmable control device. It therefore executes machine code 8 of a computer program 9, which is used to program the control device 6, during operation. The machine code 8 can therefore be directly executed by the control device 6. The execution of the machine code 8 causes the control device 6 to operate the machine according to an operating method which is explained in more detail below in connection with FIGS. 2 to 3.

The computer program 9 may have been stored in the control device 6 as early as during production of the control device 6. Alternatively, it is possible for the computer program 9 to be supplied to the control device 6 via a computer-to-computer connection. In this case, the computer-to-computer connection is not illustrated in FIG. 1. It may be in the form of a connection to a LAN or to the Internet, for example. Alternatively again, it is possible to store the computer program 9 on a data storage medium 10 in machine-readable form and to supply the computer program 9 to the control device 6 via the data storage medium 10. In this case, the data storage medium 10 is of any desired configuration. For example, it is possible for the data storage medium 10 to be in the form of a USB memory stick or in the form of a memory card. A configuration of the data storage medium 10 in the form of a CD-ROM is illustrated in FIG. 1.

The operation of the machine is explained in more detail below in connection with FIG. 2.

According to FIG. 2, in a step S1, the control device 6 connects the drive 3 to the power supply 5 via the actuator 4 in such a manner that the drive 3 excites the machine to vibrate over a frequency range F. In this case, the machine can alternatively be excited to vibrate directly or indirectly. This is discussed in more detail below in connection with FIG. 3.

In a step S2, the control device 6 receives the time-dependent signal S from the sensor 7. In this case, it goes without saying that the time-dependent signal S is previously detected by the sensor 7 and is transmitted to the control device 6.

The signal S is characteristic of vibrations which have been excited on account of the electrical drive 3 being driven in step S1. The vibrations have frequencies f which correspond to those in the frequency range F.

The signal S detected by the sensor 7 must be characteristic of the amplitude and/or phase angle of the excited vibrations. The signal S detected by the sensor 7 is generally characteristic of both the amplitude and the phase angles of the excited vibrations. For this purpose, the sensor 7 may, in principle, be designed in any desired manner provided that it has the desired sensitivity. For example, the sensor 7 may be in the form of a displacement sensor, a velocity sensor, an acceleration sensor, a force sensor or a pressure sensor.

In a step S3, the control device 6 analyzes the frequency of the time-dependent signal S. For example, it may carry out a Fourier transformation.

In a step S4, the control device 6 relates the frequency analysis in step S3 to the vibrational excitation. For example, the control device 6 may relate the amplitude and/or phase angle of the individual excited vibrations to the amplitude and/or phase angle of the corresponding vibrational excitation.

In a step S5, the control device 6 uses the relating operation in step S4 to determine a state of at least one element of the machine, for example the shaft 2, the basic body 1, the drive 3 or a bearing (not illustrated in FIG. 1) of the shaft 2 in the basic body 1.

The control device 6 can determine the state, for example, by determining the ratio of the amplitude of the excited vibration to the amplitude of the vibrational excitation for each frequency f, determining the phase offset between the excited vibration and the exciting vibration and comparing these values with reference values stored in the control device 6. The corresponding state can then be inferred depending on the result of the comparison.

In a step S6, the control device 6 outputs a message M to an operator 11 of the machine. In this case, the message M output depends on the state of the machine determined in step S5. For example, a warning message, an alarm message or a message stating that everything is OK can be output.

In order to excite the vibrations, FIG. 3 provides for an interference variable Z to be applied to the drive 3. In this case, the interference variable Z is applied—directly or indirectly via the converter 4—by the control device 6. This procedure has the advantage that it can be carried out without having to convert the machine. In this case, the interference variable Z is applied to a "normal" drive signal A of the drive 3.

The interference variable Z has at least one frequency f which is inside the frequency range F. For this purpose, two alternative procedures are possible. On the one hand, it is possible for the interference variable Z to be a sinusoidal interference variable whose frequency f passes through the frequency range F. Alternatively, it is possible for the interference variable Z to be a pseudobinary interference variable whose spectrum covers the frequency range F.

The present invention has many advantages. In particular, a simple acceleration sensor or the like suffices to assess the state of the machine. Furthermore, the transfer response provides information on the state of the overall system (=machine) and the state of individual components 1 to 3 of the system. Temporal variations in the transfer response, which may be caused, for example, by thermal or mechanical effects, may be clearly worked out. It is possible to determine the state of bearings. Finally, it is possible to use the transfer response to optimize components of the machine.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent includes equivalents of the elements recited in the claims.

What is claimed is:

1. A method for operating a machine having a drive, comprising the steps of:
    connecting the drive to a power supply using at least one actuator, so that the drive starts from a standstill when connected to the power supply, and the drive directly or indirectly excites the machine to vibrate over a frequency range;
    detecting a time-dependent signal that is characteristic of the excited vibrations;
    analyzing the frequency of the time-dependent signal;
    determining a state of at least one element of the machine using a relation of the frequency analysis to the excitation,
    outputting a message concerning the determined state of the at least one element of the machine to an operator of the machine;
    applying an interference variable to the drive to excite vibrations, said interference variable having at least one frequency inside the frequency range.

2. The operating method as claimed in claim 1, wherein the interference variable is a sinusoidal interference variable having a frequency that passes through the frequency range.

3. The operating method as claimed in claim 1, wherein the interference variable is a pseudobinary interference variable having a spectrum that covers the frequency range.

4. The operating method as claimed in claim 1, characterized in that the drive is in the form of an electrical, hydraulic or pneumatic drive.

5. The operating method of claim 1 wherein the actuator is switched by the control device only in a binary manner.

6. The operating method of claim 1 wherein the actuator is driven in a proportional manner.

7. The operating method of claim 1 wherein the sensor is one member of a group consisting of a displacement sensor, a velocity sensor, an acceleration sensor, a force sensor and a pressure sensor.

8. The operating method of claim 1 wherein the signal detected by the sensor is characteristic of the amplitude and the phase angle of the excited vibrations.

9. The operating method of claim 1 further comprising the step of determining the state of the at least one element of the machine using a relation an amplitude of the excited vibrations to an amplitude of the excitation.

10. The operating method of claim 1 further comprising the step of determining the state of the at least one element of the machine using a relation of a phase angle of the excited vibrations to a phase angle of the excitation.

11. A computer program stored on a non-transitory computer-readable medium having machine code wherein the machine code when loaded into a memory of that can be directly executed by a control device for a machine having a drive, the execution of the machine code causing and executed by the control device, causes the control device to operate the machine, said computer program comprising:
  program means for connecting the drive to a power supply using at least one actuator, so that the drive starts from a standstill when connected to the power supply, and the drive directly or indirectly excites the machine to vibrate over a frequency range;
  program means for detecting a time-dependent signal that is characteristic of the excited vibrations;
  program means for analyzing the frequency of the time-dependent signal;
  program means for determining a state of at least one element of the machine using a relation of the frequency analysis to the excitation;
  program means for outputting a message concerning the determined state of the at least one element of the machine to an operator of the machine; and
  program means for applying an interference variable to the drive to excite vibrations, said interference variable having at least one frequency inside the frequency range.

12. The computer program of claim 11, wherein the interference variable is a sinusoidal interference variable having a frequency that passes through the frequency range.

13. The computer program of claim 11, wherein the interference variable is a pseudobinary interference variable having a spectrum that covers the frequency range.

14. The computer program of claim 11 further comprising program means for determining the state of the at least one element of the machine using a relation an amplitude of the excited vibrations to an amplitude of the excitation.

15. The computer program of claim 11 further comprising program means for determining the state of the at least one element of the machine using a relation of a phase angle of the excited vibrations to a phase angle of the excitation.

16. A non-transitory data storage medium on which a computer program is stored in machine-readable form, said computer program having machine code that can be directly executed by a control device for a machine having a drive, the execution of the machine code causing the control device to operate the machine by:
  connecting the drive to a power supply using at least one actuator, so that the drive starts from a standstill when connected to the power supply, and the drive directly or indirectly excites the machine to vibrate over a frequency range;
  detecting a time-dependent signal that is characteristic of the excited vibrations;
  analyzing the frequency of the time-dependent signal;
  determining a state of at least one element of the machine using a relation of the frequency analysis to the excitation,
  outputting a message concerning the determined state of the at least one element of the machine to an operator of the machine; and
  applying an interference variable to the drive to excite vibrations, said interference variable having at least one frequency inside the frequency range.

17. The data storage medium of claim 16 further comprising program means for determining the state of the at least one element of the machine using a relation an amplitude of the excited vibrations to an amplitude of the excitation.

18. The data storage medium of claim 16 further comprising program means for determining the state of the at least one element of the machine using a relation of a phase angle of the excited vibrations to a phase angle of the excitation.

19. A control device for a machine having a drive and a computer program, said control device comprising:
  means for connecting the drive to a power supply using at least one actuator, so that the drive starts from a standstill when connected to the power supply, and the drive directly or indirectly excites the machine to vibrate over a frequency range;
  means for detecting a time-dependent signal that is characteristic of the excited vibrations;
  means for analyzing the frequency of the time-dependent signal;
  means for determining a state of at least one element of the machine using a relation of the frequency analysis to the excitation,
  means for outputting a message concerning the determined state of the at least one element of the machine to an operator of the machine; and
  means for applying an interference variable to the drive to excite vibrations, said interference variable having at least one frequency inside the frequency range.

20. The control device of claim 19 further comprising means for determining the state of the at least one element of the machine using a relation an amplitude of the excited vibrations to an amplitude of the excitation.

21. The control device of claim 19 further comprising means for determining the state of the at least one element of the machine using a relation of a phase angle of the excited vibrations to a phase angle of the excitation.

22. A machine having a drive, a control device, and a sensor, said machine comprising:
  means for connecting the drive to a power supply using at least one actuator, so that the drive starts from a standstill when connected to the power supply, and the drive directly or indirectly excites the machine to vibrate over a frequency range;
  means for detecting a time-dependent signal that is characteristic of the excited vibrations;
  means for analyzing the frequency of the time-dependent signal;
  means for determining a state of at least one element of the machine using a relation of the frequency analysis to the excitation,
  means for outputting a message concerning the determined state of the at least one element of the machine to an operator of the machine; and means for applying an interference variable to the drive to excite vibrations, said interference variable having at least one frequency inside the frequency range.

23. The machine of claim 22 further comprising means for determining the state of the at least one element of the machine using a relation an amplitude of the excited vibrations to an amplitude of the excitation.

24. The machine of claim 22 further comprising means for determining the state of the at least one element of the machine using a relation of a phase angle of the excited vibrations to a phase angle of the excitation.

25. The machine of claim 22 wherein the drive is an electrical, hydraulic or pneumatic drive.

26. The machine of claim 22 wherein the actuator is switched by the control device only in binary manner.

27. The machine of claim 22 wherein the actuator is driven in a proportional manner.

* * * * *